US006744884B1

United States Patent
Bjarnason (10) Patent No.: US 6,744,884 B1
(45) Date of Patent: Jun. 1, 2004

(54) SPEAKER-PHONE SYSTEM CHANGE AND DOUBLE-TALK DETECTION

(75) Inventor: Elias Bjarnason, Baughus (IS)

(73) Assignee: Skyworks Solutions, Inc., Newport Beach, CA (US)

( * ) Notice: Subject to any disclaimer, the term of this patent is extended or adjusted under 35 U.S.C. 154(b) by 610 days.

(21) Appl. No.: 09/675,291

(22) Filed: Sep. 29, 2000

(51) Int. Cl.[7] ............................ H04M 1/00; H04M 9/00; H04M 9/08
(52) U.S. Cl. ............................ 379/406.01; 379/406.02; 379/406.03; 379/406.04; 379/406.05; 379/406.06; 379/406.07; 379/406.08; 379/406.09; 379/406.11; 379/406.12; 379/406.13; 379/406.14; 379/406.15; 379/406.16; 379/420.01; 379/388.02; 379/406.1; 370/286
(58) Field of Search ............... 379/406, 406.01–406.16, 379/420.01–420.04, 388.02; 375/285, 296; 370/286

(56) References Cited

U.S. PATENT DOCUMENTS

| | | | | |
|---|---|---|---|---|
| 5,343,521 A | * | 8/1994 | Jullien et al. | 379/406.07 |
| 6,249,757 B1 | * | 6/2001 | Cason | 704/214 |
| 6,269,161 B1 | * | 7/2001 | McLaughlin et al. | 379/406.01 |
| 6,272,106 B1 | * | 8/2001 | Kawahara et al. | 370/201 |

* cited by examiner

Primary Examiner—Duc Nguyen
Assistant Examiner—Alexander Jamal (74) Attorney, Agent, or Firm—Christopher J. Rourk; Akin Gump Strauss Hauer & Feld, LLP (57) ABSTRACT

A speaker-phone that is operable to perform system change detection, double-talk detection and if desired, optimal step-size control. The invention differentiates between system change and double-talk and is operable to these two situations differently. The invention does not rely solely on the energy measurements that are employed by conventional speaker-phones. Highly reliable system change detection is offered when compared to conventional speaker-phones. The direction and the amplitude of the system change is measured with very good detection probability in the invention. For double-talk detection, the invention does not rely on assumptions that the far-end echoes are of lower amplitude that the near-end signal in performing double-talk detection. The invention performs double-talk detection within a large diversity of echo-paths and background noise levels. A designer may tune the speaker-phone system to ensure proper double-talk detection near low levels of the near-end signal. The step-size optimization control is performed in response to both the system change detection and the double-talk detection. If desired, no step-size optimization control need be performed at all. In embodiments where the certain design budgets allow, a backup of the echo canceller is employed. This allows the speaker-phone system to make mistakes without losing the echo canceller gain if an improper decision is made. The invention allows for designer control over parameters such as thresholds, constants and time constants, depending on what numerical resolution is used in the calculations and what preferences one has for items such as sensitivity to double-talk and system change.

20 Claims, 9 Drawing Sheets

SPEAKER-PHONE SYSTEM CHANGE AND DOUBLE-TALK DETECTION

CROSS REFERENCE TO RELATED APPLICATIONS

The following U.S. Patent Application is hereby incorporated herein by reference in its entirety and made part of the present U.S. Patent Application for all purposes:

1) U.S. patent application Ser. No. 09/630,845, entitled "FULL DUPLEX SPEAKER-PHONE PROVIDING INCREASED LOOP STABILITY," filed Aug. 2, 2000.

BACKGROUND

1. Technical Field

The invention relates generally to speaker-phones; and, more particularly, it relates to a combined speaker-phone system that is operable to perform system change and double talk detection using an optimal step size in certain embodiments of the invention.

2. Related Art

Conventional speaker-phone systems commonly employ some kind of energy measures to detect system changes in the echo path. These conventional systems commonly use gain measures of the echo canceller and combine them with signal energy measurements to detect system changes. This conventional method to perform system change detection is suitable for large system changes, particular those where the gain of the echo canceller is suddenly negative. However, this conventional method to perform system change detection is unsuitable for detecting smaller system changes, and it is highly unreliable to perform system change detection in general.

For those conventional speaker-phone systems that attempt to perform double-talk detection, certain assumptions concerning the various far end and near end signals commonly exist. For example, a common assumption is that the far end echoes are of lower amplitude that those of the near end signal. Therefore, given that this is a primary design constraint, the speaker-phone double-talk detection method will operate only when this assumption is true. In reality, this assumption is often not the case. Another assumption effectuates the filtering out of the received signal in the speaker-phone. For example, the transmit signal is filtered with the inverse of the band-stop filter in the receive path to perform double-talk detection. In this case, when the energy of the filtered signal in the transmit path increases above a certain threshold, then double-talk is assumed. These several assumptions lead to double-talk detection that is often performed with a substantially low rate of success. For example, the perceptual quality of the operation if the speaker-phone, when double-talk is not detected is substantially reduced. The user friendliness of the speaker-phone is significantly compromised. Other deficiencies exist in speaker-phone systems that employ these many conventional assumptions while attempting to offer multiple functionality.

For example, conventional speaker-phones that attempt to perform both system change detection and double-talk detection typically fail across many fronts. One is the highly unreliable manner in which they seek to perform system change detection, as described above. Another deficiency is inherent assumptions that most designers of double-talk detection speaker-phones rely upon in making critical design decisions, as also mentioned above. The deficiencies of both of these conventional methods is that the total, combined deficiencies typically result in an overall speaker-phone system that simply fails to provide a high degree of user satisfaction. The perceptual qualities of the speaker-phone are radically compromised, in that, unreliable system change detection that can potentially lead to a false system change detection or a failure to perform an accurate system change detection in the event of an actual system change detection will lead to the speaker-phone system to provide significantly reduced perceptual quality. As mentioned above, when the deficiencies of one such method are combined with the deficiencies of another method of function that is sought to be provided within a speaker-phone, then the total deleterious effects are commonly magnified. That is to say, the overall functionality of the speaker-phone suffers even more. The conventional speaker-phone systems do not provide for highly robust and reliable operation of both system change detection and double-talk detection.

Further limitations and disadvantages of conventional and traditional systems will become apparent to one of skill in the art through comparison of such systems with the present invention as set forth in the remainder of the present application with reference to the drawings.

SUMMARY OF THE INVENTION

Various aspects of the present invention can be found in a speaker-phone that is operable to perform system change detection and double-talk detection using an optimal step size. The speaker-phone itself contains, among other things, a main control circuitry, an echo canceller communicatively coupled to the main control circuitry, a transmit circuitry communicatively coupled to the main control circuitry, a receive circuitry communicatively coupled to the main control circuitry, a system change detection circuitry that is operable to perform system change detection, the system change detection circuitry modifies the transmit circuitry and the receive circuitry when a system change is detected, a double-talk detection circuitry that is operable to perform double-talk detection such that the double-talk detection circuitry modifies the transmit circuitry and the receive circuitry when double-talk is detected, a step size control circuitry that is operable to perform step size optimization of a step size. The speaker-phone is operable to differentiate between the system change and the double-talk by comparing a correlation value to a threshold, the correlation value is calculated using an input signal of the echo canceller and an output signal of the echo canceller.

In certain embodiments of the invention, the speaker-phone also contains a microphone having an input signal, and the double-talk detection circuitry calculate a number of autocorrelation coefficients of the output signal of the echo canceller and the input signal of a microphone to enhance double-talk detection. The system change detection circuitry considers a speech detect level and a gain of the echo canceller to perform system change detection. The double-talk detection circuitry uses a time constant to calculate background noise energy. The double-talk detection circuitry calculates a weighted distance to perform double-talk detection. The speaker-phone is a full band digital speaker-phone in one embodiment and a full band analog speaker-phone in another embodiment.

Other aspects of the present invention can be found in a speaker-phone that is operable to perform both system change detection and double-talk detection. The speaker-phone itself contains, among other things, a main control circuitry, a system change detection circuitry, communicatively coupled to the main circuitry, that is operable to perform system change detection, and a double-talk detection circuitry, communicatively coupled to the main circuitry, that is operable to perform double-talk detection. The speaker-phone is operable to differentiate between a system change and a double-talk by comparing a correlation value to a threshold.

In certain embodiments of the invention, the speaker-phone also contains a step size control circuitry that is operable to perform step size optimization of a step size when performing at least one of system change detection and double-talk detection. The step size control circuitry automatically throttles the step size during double-talk. The speaker-phone also contains an acoustic echo canceller having a gain measure, and the speaker-phone is operable to prevent a false double-talk detection by considering the echo canceller gain measure. The speaker-phone also contains a transmit circuitry and a receive circuitry. The speaker-phone modifies the transmit circuitry and the receive circuitry to operate at double-talk when operating at full duplex. The double-talk detection circuitry uses a tuning factor to control a sensitivity used to perform the double-talk detection. The tuning factor is adjusted by a designer of the speaker-phone. When the speaker-phone further contains an acoustic echo canceller, the speaker-phone ceases updating of the acoustic echo canceller when a perturbation is detected.

Other aspects of the present invention can be found in a method to perform system change detection and double-talk detection in a speaker-phone. The method involves, among other things, detecting a perturbation in the speaker-phone, ceasing to update an acoustic echo canceller within the speaker-phone, and determining whether the perturbation corresponds to a system change or double-talk within the speaker-phone.

In certain embodiments of the invention, the method also includes determining whether the speaker-phone operates at full duplex, and setting the speaker-phone to operate at double-talk when the speaker-phone operates at full duplex. The method performs double-talk detection using a low pass filtered distance measurement. As described above within other embodiments of the invention, the speaker-phone is a full band digital speaker-phone in some embodiments, and it is a full band analog speaker-phone in other embodiments.

Other aspects, advantages and novel features of the present invention will become apparent from the following detailed description of the invention when considered in conjunction with the accompanying drawings.

BRIEF DESCRIPTION OF THE DRAWINGS

A better understanding of the present invention can be obtained when the following detailed description of various exemplary embodiments are considered in conjunction with the following drawings.

DETAILED DESCRIPTION OF THE INVENTION

To detect in a receive mode of operation in a speaker-phone whether there is a system change in the echo path or double-talk, it is important to know when to refresh the update rate of the echo canceller (EC) and when to freeze it. Also, it is important to change from receive only attenuation to double-talk attenuation; this necessitates reliable double-talk detection and system change detection. The invention overcomes the prior art deficiencies in that the measures of a system change and of double-talk are substantially similar in nature. First, there is a differentiation of whether there is double-talk and/or system change in the speaker-phone system. The echo canceller update is frozen, and it is then decided whether there is a system change or double-talk. When a system change is detected, the update rate of the echo canceller is increased.

A designer's choice is given as how to control the transmit and receive paths' attenuations. For example, to operate the speaker-phone as close to full-duplex as possible, the designer decides on double-talk until it is accurately determined if there really is double-talk or whether a perturbation is in fact a system change. In such an instance, the far-end will hear echoes, if there is really a system change and no double-talk. If alternatively the double-talk attenuation is when there is certainty in double-talk detection, a first segment of a double-talk conversation may be missed. One design embodiment is to suppose in the network echo canceller that there is no path attenuation whatsoever.

If desired in embodiments of the invention where constraints permit, a backup of the echo canceller is maintained. In this embodiment, mistakes are better tolerated without losing echo canceller gain when an improper decision is made. However, to ensure that proper decision-making is performed, the backup echo canceller is restored at regular intervals with the adapted echo canceller when the error energy for the adapted echo canceller is smaller than the backup echo canceller over the time segment. For example, as the hybrids typically have echo attenuation between 2–20 dB, there is no guarantee (in double-talk) that the echoes have less energy than the near-end signal (in double-talk). Simple energy measures are insufficient, and therefore no attenuation is put into the paths during a system change detection. If echo attenuation is used, then the designer should reduce the attenuation during double-talk. In this specific instance, a combined system change detection and double-talk detection system must be used as the one offered in the invention.

Figure 1:
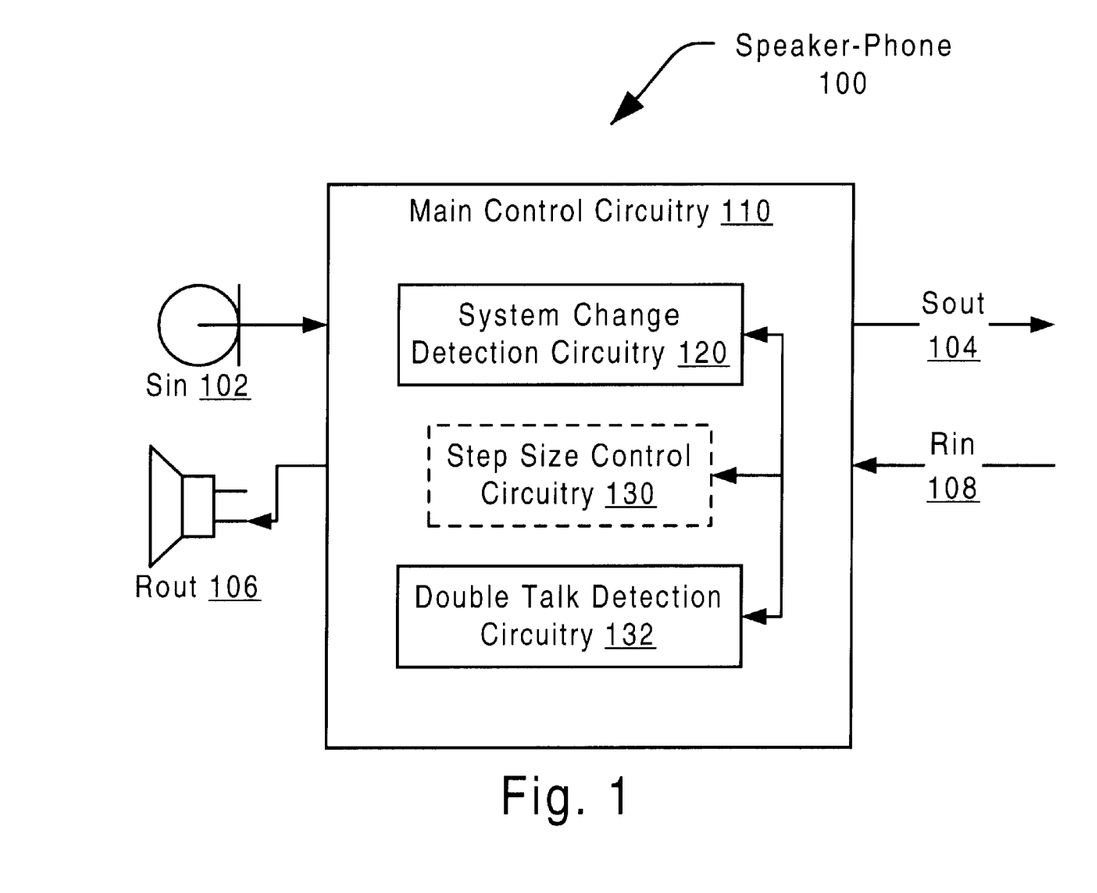
FIG. 1 is a system diagram illustrating one embodiment of a speaker-phone built in accordance with the present invention.

FIG. 1 is a system diagram illustrating one embodiment of a speaker-phone 100 built in accordance with the present invention. The full band speaker-phone 100 employs a main control circuitry 110. An input speech signal is provided to the main control circuitry 10 from a microphone Sin 102.

After the speech signal is processed within the main control circuitry 110, the signal is emitted as shown by the output signal Sout 104 where it is transferred across a communication link that is part of the total telephone system to another telephone that is also part of the total telephone system. An input signal Rin 108 is received across the communication link from the other telephone. After the input signal is processed within the main control circuitry 110, the signal is emitted as an output signal as shown by the output speaker Rout 106. The main control circuitry 110 contains, among other things, a system change detection circuitry 120, a double-talk detection circuitry 132, and if desired, a step size control circuitry 130.

The system change detection circuitry 132 is operable to perform reliable system change detection of the operation of the speaker-phone 100. The double-talk detection circuitry 132 is operable to perform detection of when users at both ends of the speaker-phone are speaking. When a local and a remote user of the speaker-phone 100 are speaking, the double-talk detection circuitry 132 is operable to perform this detection. For each of the operations of system change detection and double-talk detection, the step size that is to be employed within the speaker-phone 100 is capable to be controlled using the step size control circuitry 130 in certain embodiments of the invention. The step size control circuitry 130 is optional in various embodiments, and the operation of the speaker-phone is not compromised without it. As shown in the system diagram of the FIG. 1, each of the system change detection circuitry 120, the double-talk detection circuitry 132, and the optional step size control circuitry 130 are all operable in conjunction with each of the various circuitries. The operation of none of the system change detection circuitry 120, the double-talk detection circuitry 132, and the optional step size control circuitry 130 results in the compromised operation of the other circuitries, as is present within many conventional speaker-phone systems. The speaker-phone 100 is operable to perform the multiple operations provided within the various circuitries in conjunction.

Figure 2:
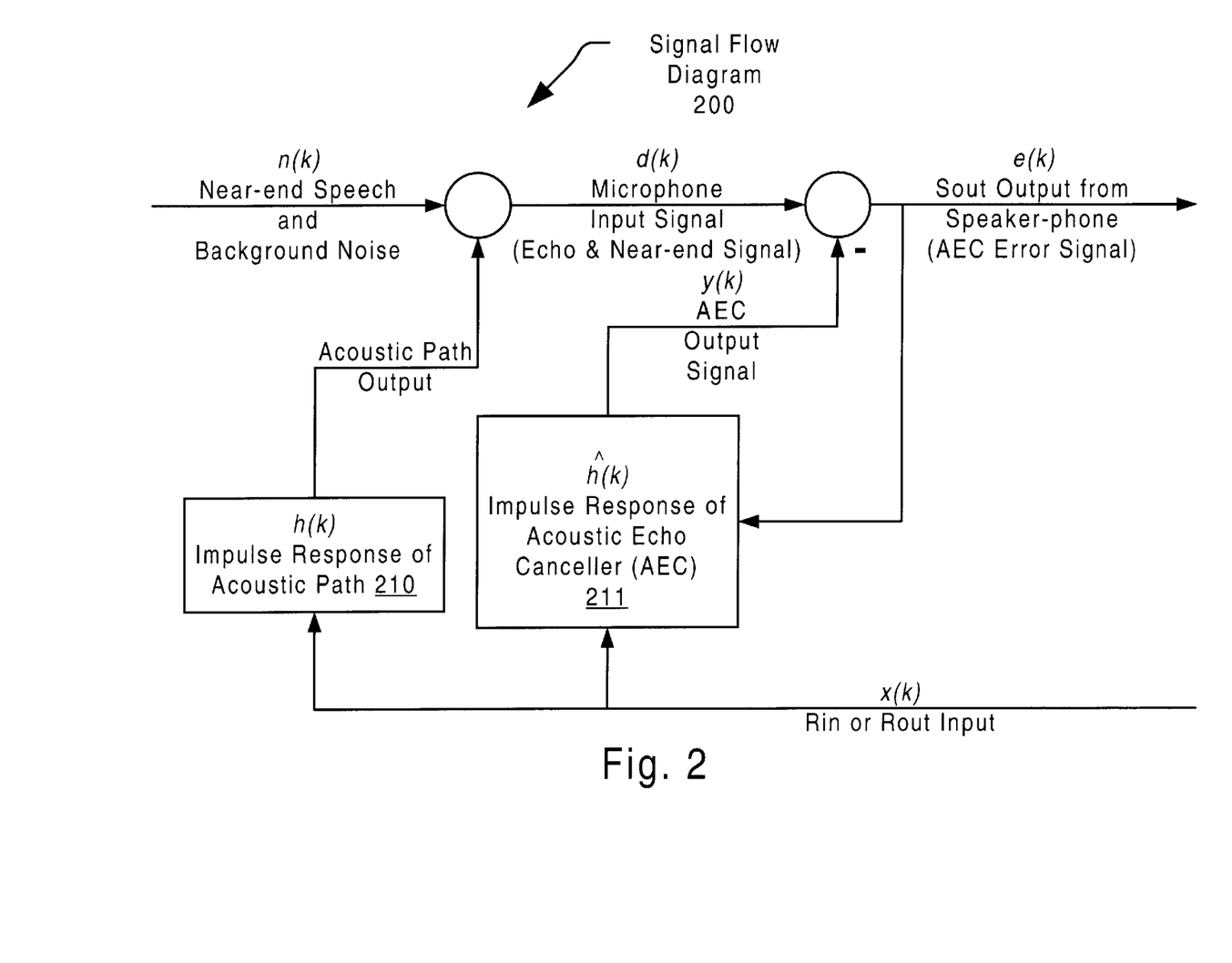
FIG. 2 is a signal flow diagram illustrating one embodiment of signal flow performed in accordance with the present invention.

FIG. 2 is a signal flow diagram illustrating one embodiment of signal flow performed in accordance with the present invention. A near end speech and background noise signal, n(k), is provided to a first summing junction. After combination with an acoustic path output, that is provided by the impulse response of the acoustic path, h(k) 210, the now-combined near end speech and background noise signal, n(k) and the acoustic path output are fed shown as the microphone input signal d(k), including both the echo and near-end signal. This signal is fed to a second summing junction where it is combined with the negative of the acoustic echo canceller (AEC) signal shown as y(k). This signal is provided as shown by the impulse response of the acoustic echo canceller (AEC), shown as the signal shown ĥ(k) 211. The signal that provides both the impulse response of the acoustic path, h(k) 210 and the impulse response of the acoustic echo canceller (AEC), shown as the signal shown ĥ(k) 211 is shown as the signal x(k) provided by the Rin or Rout input signal. The output of this second summing junction is provided at the signal e(k) provided as the Sout or the output from the speaker-phone. This signal is also viewed as the acoustic echo canceller (AEC) error signal.

Figure 3:
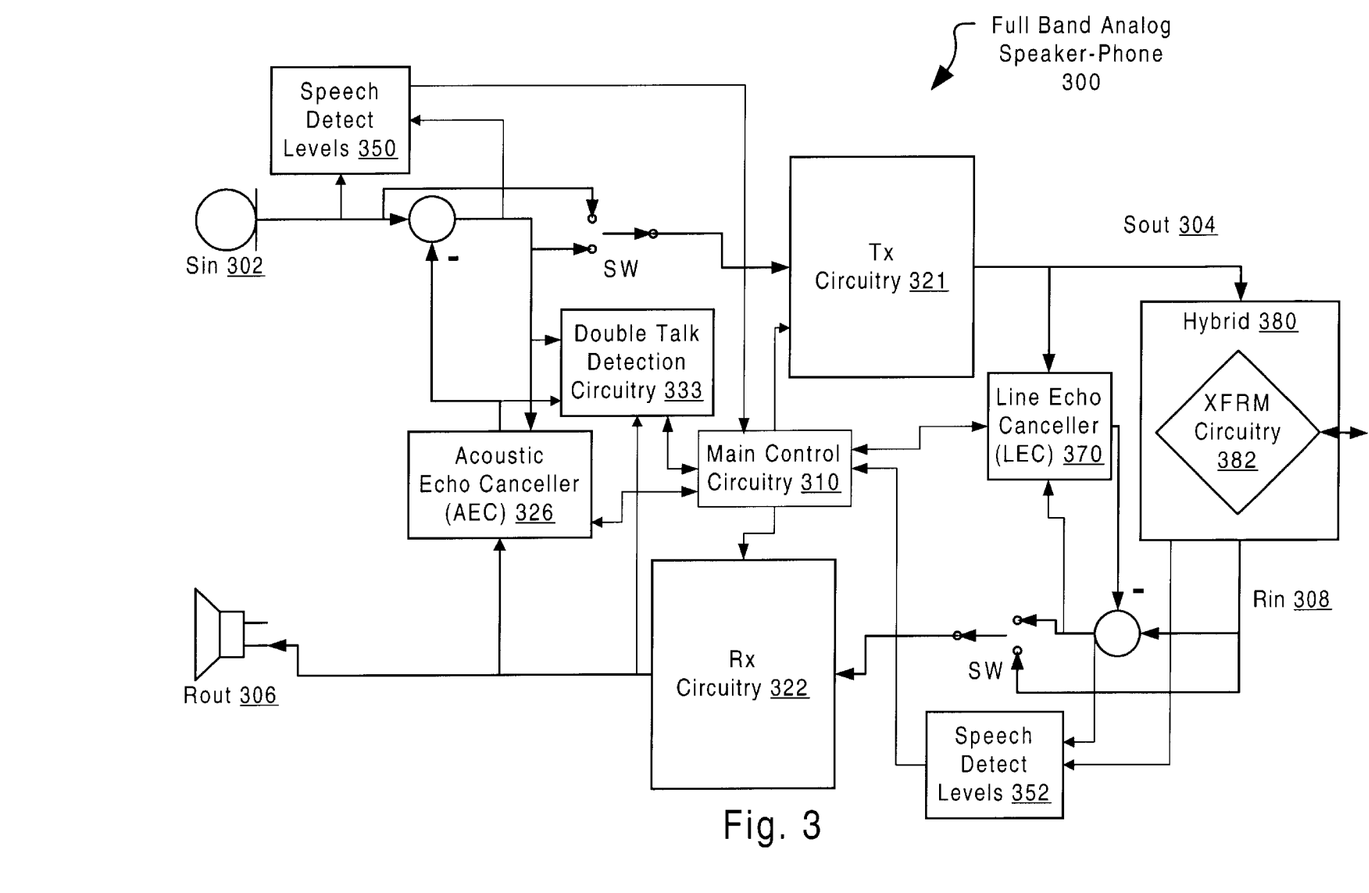
FIG. 3 is a system diagram illustrating an embodiment of a full band analog speaker-phone built in accordance with the present invention.

FIG. 3 is a system diagram illustrating an embodiment of a full band analog speaker-phone 300 built in accordance with the present invention. The full band analog speaker-phone 300 employs a main control circuitry 310. An input speech signal is provided from a microphone Sin 302. After the speech signal is processed within the full band analog speaker-phone 300, the signal is emitted as shown by the output signal Sout 304 where it is transferred across a communication link that is part of a total telephone system to another telephone that is also part of the total telephone system. An input signal Rin 308 is received across the communication link from the other telephone. After the input signal is processed within the full band analog speaker-phone 300, the signal is emitted as an output signal as shown by the output speaker Rout 306. A main control circuitry within the full band analog speaker-phone 300 controls virtually all of the interaction of the various circuitries to perform speaker-phone operation.

The speech signal provided from the microphone Sin 302 is fed to a summer that is followed by a switch and subsequently to a transmit (Tx) circuitry 321. Before the switch, the speech signal is also passed to an acoustic echo canceller (AEC) 326, and a measurement of it is passed to a double talk detection circuitry 333. Afterwards, the now-processed speech signal is passed to a hybrid 380. The hybrid 380 contains, among other things, a transformer (XFRM) circuitry 382. The XFRM circuitry 382 is operable inside the full band analog speaker-phone 300 to interface the to other analog circuitry that are operable at different voltage levels or at the same voltage level. The output from the Tx circuitry 321 is also fed to a line echo canceller (LEC) 370 as well.

The input signal Rin 308 is fed to a summer that is followed by a switch and subsequently to a receive Rx circuitry 322. Afterwards the input signal Rin 308, after being processed by the Rx circuitry 322, is passed to the output speaker Rout 306. In addition, the Rx processed input signal Rin 308 is passed to the acoustic echo canceller (AEC) 326, and a measurement of it is passed to the double talk detection circuitry 333.

In addition to the passing of the actual speech signals within the full band analog speaker-phone 300, certain measurements from those speech signals are also used in certain embodiments of the invention to control the signal processing within the full band analog speaker-phone 300, some of which have been mentioned above. For example, from the speech signal provided from the microphone Sin 302, speech detect levels 350 are measured for the speech signal. Similarly, for the speech signal received as the input signal Rin 308, speech detect levels 352 are measured for the speech signal. Both the speech detect levels 350 and the speech detect levels 352 are provided to the main control circuitry 310. The main control circuitry 310 also operates cooperatively with the acoustic echo canceller (AEC) 326, the double talk detection circuitry 333, the Tx circuitry 321, the Rx circuitry 322, and the line echo canceller (LEC) 370 to provide the overall control of the full band analog speaker-phone 300. Various other signal and measurement paths are shown as illustrated in the FIG. 3. For example, the various switches, each one connected to its respective portion of the speech signals that are fed to the full band analog speaker-phone 300, are operable to be switched in or out depending on the mode of operation in which the full band analog speaker-phone 300 is operating or the specific level of sliding filtering that is to be performed.

When the input signal Rin 308, after being processed by the Rx circuitry 322, is provided to the acoustic echo canceller (AEC) 326, the main control circuitry 310 will use information provided by the acoustic echo canceller (AEC) 326, the double talk detection circuitry 333, as well as information provided by the speech detect levels 350 and the speech detect levels 352, to control the overall operation of the full band analog speaker-phone 300. In addition, when the speech signal provided from the microphone Sin 302, after being processed by the Tx circuitry 321, is provided to the line echo canceller (LEC) 370, the main control circuitry 310 will similarly use information provided by the acoustic echo canceller (AEC) 326, the double talk detection circuitry 333, as well as information provided by the speech detect levels 350 and the speech detect levels 352, to control the overall operation of the full band analog speaker-phone 300.

Figure 4:
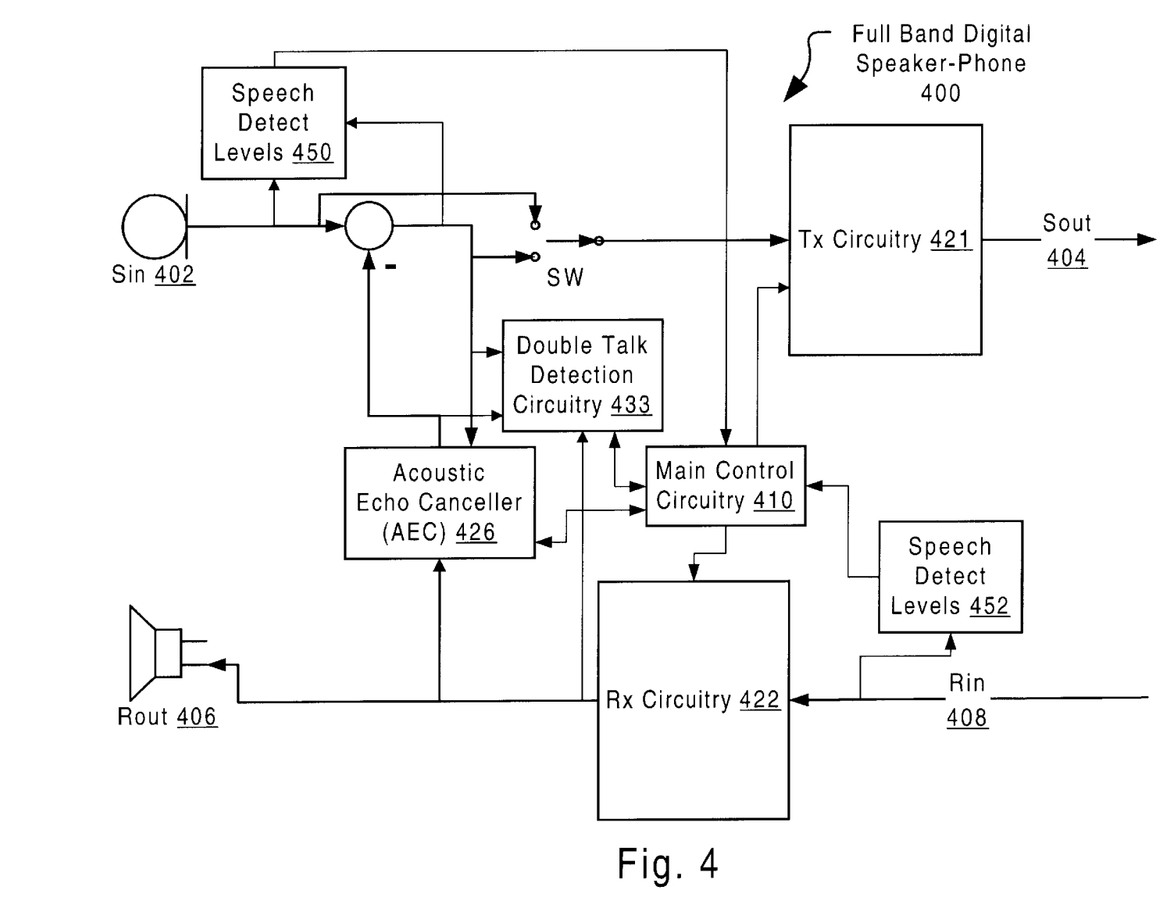
FIG. 4 is a system diagram illustrating an embodiment of a full band digital speaker-phone built in accordance with the present invention.

FIG. 4 is a system diagram illustrating an embodiment of a full band digital speaker-phone 400 built in accordance with the present invention. The full band digital speaker-phone 400 employs a main control circuitry 410. An input speech signal is provided from a microphone Sin 402. After the speech signal is processed within the full band digital speaker-phone 400, the signal is emitted as shown by the output signal Sout 404 where it is transferred across a communication link that is part of a total telephone system to another telephone that is also part of the total telephone system. An input signal Rin 408 is received across the communication link from the other telephone. After the input signal is processed within the full band digital speaker-phone 400, the signal is emitted as an output signal as shown by the output speaker Rout 406. A main control circuitry within the full band digital speaker-phone 400 controls virtually all of the interaction of the various circuitries to perform speaker-phone operation.

The speech signal provided from the microphone Sin 402 is fed to a summer that is followed by a switch and subsequently to a transmit (Tx) circuitry 421. Afterwards, the now-processed speech signal is transmitted to another telephone that is also part of the total telephone system as shown by the output signal Sout 404. The speech signal provided from the microphone Sin 402, before being passed to the Tx circuitry 421, is also passed to an acoustic echo canceller (AEC) 426, and a measurement of it is passed to a double talk detection circuitry 433.

The input signal Rin 408 that is received across the communication link from the other telephone is fed to the Rx circuitry 422 for processing, and afterwards, it is fed to the output speaker Rout 406. In addition, the Rx processed input signal Rin 408 is passed to the acoustic echo canceller (AEC) 426, and a measurement of it is passed to the double talk detection circuitry 433.

In addition to the passing of the actual speech signals within the full band digital speaker-phone 400, certain measurements from those speech signals are also used in certain embodiments of the invention to control the signal processing within the full band analog speaker-phone 400, some of which have been described. For example, from the speech signal provided from the microphone Sin 402, speech detect levels 450 are measured for the speech signal. Similarly, for the speech signal received as the input signal Rin 408, speech detect levels 452 are measured for the speech signal. Both the speech detect levels 450 and the speech detect levels 452 are provided to the main control circuitry 410. The main control circuitry 410 also operates cooperatively with the acoustic echo canceller (AEC) 426, the double talk detection circuitry 433, the Tx circuitry 421, and the Rx circuitry 422 to provide the overall control of the full band digital speaker-phone 400. Various other signal and measurement paths are shown as illustrated in the FIG. 4. For example, the various switches, each one connected to its respective portion of the speech signals that are fed to the full band digital speaker-phone 400, are operable to be switched in or out depending on the mode of operation in which the full band digital speaker-phone 400 is operating.

As disclosed at the beginning of the patent application, the following U.S. Patent Application is hereby incorporated herein by reference in its entirety and made part of the present U.S. Patent Application for all purposes: U.S. patent application Ser. No. 09/630,845, entitled "FULL DUPLEX SPEAKER-PHONE PROVIDING INCREASED LOOP STABILITY," filed Aug. 2, 2000. When a sliding filter is employed in various embodiments of the invention, the above-described functionality is proffered.

When the input signal Rin 408, after being processed by the Rx circuitry 422, is provided to the acoustic echo canceller (AEC) 426, the main control circuitry 410 will use information provided by the acoustic echo canceller (AEC) 426, the double talk detection circuitry 433, as well as information provided by the speech detect levels 450 and the speech detect levels 452, to control the overall operation of the full band digitl speaker-phone 400. In addition, when the speech signal provided from the microphone Sin 402, after being processed by the Tx circuitry 421, the main control circuitry 410 will similarly use information provided by the acoustic echo canceller (AEC) 426, the double talk detection circuitry 433, as well as information provided by the speech detect levels 450 and the speech detect levels 452, to control the overall operation of the full band digital speaker-phone 400.

The various embodiments of the invention shown above are operable to perform the combined functionality of system change detection, double-talk detection, and if desired, optimal step size control. As the invention is operable to perform at least the combined functions of system change detection and double-talk detection, the signals used in the double-talk/system change detection method are defined as follows:

$d(k)$: echo and near-end signal
$y(k)$: EC output signal
$e(k)$: EC error signal where $$e(k)=d(k)-y(k).$$

$$d(k)=h(k)*x(k)+n(k)$$

$$y(k)=\hat{h}(k)*x(k).$$

Here $h(k)$: impulse response of acoustic path
$\hat{h}(k)$: impulse response of EC
$x(k)$: far-end speech
$n(k)$: near-end speech and background noise

System Change Detection Method

To differentiate between system changes and double-talk we calculate the following correlation values:

$$r_{ye}(k)=\beta_r \cdot r_{ye}(k-1)+(1-\beta_r)\cdot y(k)\cdot e(k),$$

$$r_{dd}(k)=\beta_r \cdot r_{dd}(k-1)+(1-\beta_r)\cdot d(k)\cdot d(k).$$

$$r_{yd}(k)=\beta_r \cdot r_{yd}(k-1)+(1-\beta_r)\cdot y(k)\cdot d(k).$$

$$r_{de}(k)=\beta_r \cdot r_{de}(k-1)+(1-\beta_r)\cdot d(k)\cdot e(k).$$

$$r_{ee}(k)=\beta_r \cdot r_{ee}(k-1)+(1-\beta_r)\cdot e(k)\cdot e(k).$$

where $$\beta_r \approx 0.98-0.995.$$

We then calculate the normalized cross-correlation values:

$$r_{ye}^N(k) = \beta_r^N \cdot r_{ye}^N(k-1) + (1-\beta_r^N) \cdot \left(\frac{r_{ye}(k)}{r_{dd}(k)+r_{bias}}\right),$$

$$r_{yd}^N(k) = \beta_r^N \cdot r_{yd}^N(k-1) + (1-\beta_r^N) \cdot \left(\frac{r_{yd}(k)}{r_{dd}(k)+r_{bias}}\right),$$

$$r_{de}^N(k) = \beta_r^N \cdot r_{de}^N(k-1) + (1-\beta_r^N) \cdot \left(\frac{r_{de}(k)}{r_{dd}(k)+r_{bias}}\right),$$

$$r_{ee}^N(k) = \beta_r^N \cdot r_{ee}^N(k-1) + (1-\beta_r^N) \cdot \left(\frac{r_{ee}(k)}{r_{dd}(k)+r_{bias}}\right),$$

where $\beta_r^N \approx 0.9$.

To explain the situation the simplifying approximation that the impulse responses consist of an amplification factor is applied. We then get $$r_{ye}^N(k) \approx \frac{r_{xx}(k) \cdot \hat{h}(k) \cdot (h(k) - \hat{h}(k))}{r_{xx}(k) \cdot h^2(k) + r_{nn}(k) + r_{bias}}.$$

Here $r_{bias}$ is used to guarantee a low value of the normalized cross-correlation during silence. During double-talk and/or in particular when a system change has taken place, the absolute value of the normalized correlation goes up. The difference is that when a system change has taken place, this value remains above a certain level (positive or negative value) during talk. It is therefore sufficient to check the value of the normalized cross-correlation. As its value goes up, we decide that something has changed and freeze the echo canceller update. If it remains above certain level for a certain number of samples (200 e.g.), we decide on system change. We then increase the update rate of the echo canceller.

This method can detect changes in amplification very well. If the amplification in the echo path increases, we get a positive value in the normalized cross-correlation. If the amplitude decreases, we get a negative value. If we get a large negative value it might be preferable to reset the echo canceller because it converges rather slow in going from a high amplification filter to a low amplification filter. A designer does not know how big the changes in echo path are, e.g. when an extension phone is picked up or put down. The designer is able to tune all thresholds and lag times in the detection according to his preferences. The system change detection is, of course, combined with a speech detect and the actual gain of the echo canceller.

$r_{yd}^N$ can be used for far-end speech detection. During silence its value is close to zero whereas when the far-end speaker is active, its value goes up and is close to one in the high energy portion.

Double-Talk Detection Method

To enhance the probability of detecting double-talk, we calculate a few (4–7) autocorrelation coefficients of the AEC output signal y(k) and the microphone input signal d(k) using the equation:

$$r_{yy}^i(k) = \beta_{dis} \cdot r_{yy}^i(k-1) + (1-\beta_{dis}) \cdot y(k) \cdot y(k-i),$$

$$r_{dd}^i(k) = \beta_{dis} \cdot r_{dd}^i(k-1) + (1-\beta_{dis}) \cdot d(k) \cdot d(k-i),$$

where $\beta_{dis} \approx 0.95$, $i \in \{0, \ldots, \}$.

We then calculate a weighted distance between the normalized correlation coefficients using:

$$dist(k) = \sum_i a_i \left(\frac{r_{dd}^i(k)}{r_{dd}^0(k)+c_{bias}^{dis}} - \frac{r_{yy}^i(k)}{r_{yy}^0(k)+c_{bias}^{dis}}\right)^2,$$

or $$dist(k) = \sum_i a_i \left|\left(\frac{r_{dd}^i(k)}{r_{dd}^0(k)+c_{bias}^{dis}} - \frac{r_{yy}^i(k)}{r_{yy}^0(k)+c_{bias}^{dis}}\right)\right|.$$

Here $c_{bias}^{dis}$ and is a constant used to bias the values to near zero during silence. The individual terms in the sum are only used if they are above a certain threshold. We then low pass filter this distance measure with:

$$dist_{LP}(k) = \beta_{dis}^N \cdot dist_{LP}(k-1) + (1-\beta_{dis}^N) \cdot dist(k),$$

where $$\beta_{dis}^N = \begin{cases} 0.997; & \text{distance decreasing} \\ 0.999; & \text{distance increasing} \end{cases}$$

The above referenced value is viewed as being a tuning factor in certain embodiments of the invention; a designer of the speaker-phone can adjust the tuning factor to control the sensitivity of the speaker-phone in performing double-talk detection. The increasing time constant is only used if both the output energy of the echo canceller and the energy at the microphone input are above a certain level.

If $dist_{LP}(k) > dist_{min}$ for a certain number of samples and there is both far-end and near-end speech detect and no system change is detected, we decide on double-talk. To prevent false double-talk detection, it is possible to use the actual EC gain measure as a help. If the actual absolute value of the echo canceller gain is above some value we decide that there is no double-talk. It is also reasonable to have a large hangover time constant when we decide on double-talk in order not to miss the last part of the double-talk or short double-talk silence.

Optimal Step Size Control (Optional)

A simple method of an optimized step size control is performed by introducing $N_T$ non-causal coefficients ($N_T$ = 16 should be sufficient) into the least means square (LMS) filter vector. This is done by putting a delay $z^{-N_T}$ into the path for the desired signal. The non-causal coefficients are then initialized with a random sequence of a certain amplitude. The normalized energy of this random sequence at start has to be lesser than the average system amplification.

The update equation for the NLMS method is then given with:

$$c(k+1) = c(k) + \hat{\alpha}_{opt}(k) \cdot \frac{x(k) \cdot \hat{e}(k)}{x^T(k) \cdot x(k)}.$$

where $$\hat{e}(k) = d(k-T) - \hat{y}(k),$$

and $$\hat{y}(k) = \sum_{i=-N_T}^{N-1} c_k(i) \cdot x(k-i-N_T)$$

$$= \sum_{i=-N_T}^{-1} c_k(i) \cdot x(k-i-N_T) + \sum_{i=0}^{N-1} c_k(i) \cdot x(k-i-N_T).$$

$$= y_{nc}(k) + y_c(k)$$

$$= y_{nc}(k) + y(k-T).$$

The coefficients $C_{-N_T} \ldots C_{-1}$ are the non-causal coefficients.

The optimal step-size for a time invariant system is defined as:

$$\alpha_{opt}(k) = \alpha_0 \frac{\sigma_x^2(k) \cdot \sigma_{dis}^2(k)}{\sigma_e^2(k) + bias} < 1,$$

where $0 < \alpha_0 \leq 1$, $\hat{\alpha}_{opt}(k) = \beta_0 \cdot \hat{\alpha}_{opt}(k-1) + (1-\beta_0) \cdot \alpha_{opt}(k)$, $\sigma_x^2(k) = \beta_1 \cdot \sigma_x^2(k-1) + (1-\beta_1) \cdot x^2(k)$, $\sigma_e^2(k) = \beta_2 \cdot \sigma_e^2(k-1) + (1-\beta_2) \cdot \hat{e}^2(k)$, $\sigma_{idis}^2(k) = \beta_3 \cdot \sigma_{dis}^2(k-1) + (1-\beta_3) \cdot \|\hat{d}_k\|^2$, $$\|\hat{d}_k\| = \frac{N + N_T}{N_T} \cdot \sum_{i=-N_T}^{-1} c_k^2(i).$$

The actual output error is given with:

$e(k-T) = d(k-T) - y(k-T)$, where $$y(k-T) = \sum_{i=0}^{N-1} c_k(i) \cdot x(k-i-N_T).$$

As the LMS converges, the non-causal coefficients get smaller and smaller thus slowing the convergence speed continuously. For tracking purposes, it is therefore necessary to prevent $\alpha_{opt}(k)$ from getting to small. If the far-end speaker is active and there is no double-talk we therefore keep $\alpha_{opt}(k) < \alpha_{Min}$. When there is no speech detect on the far-end speaker we freeze the LMS. During double-talk the step size will be automatically throttled if the step size calculations are properly tuned.

If there are medium or large system changes in the echo path, the tracking value of the optimal step size is too small to track these changes fast enough. We then could have to reinitialize the non-causal coefficients and in some cases reset the causal coefficients. If the far-end speaker is active and there is no double-talk we could check for system changes simple by monitoring the gain over the echo canceller and the difference between the silence level and the actual level at the microphone input. For large negative changes in gain we simple reset the causal part of echo canceller to zero and the non-causal coefficients to their full value. For medium changes it is sufficient to reinitialize the non-causal coefficients to an amplitude that is lesser than for total reset. For small changes the tracking value of the optimal step size should be sufficient.

Figure 5:
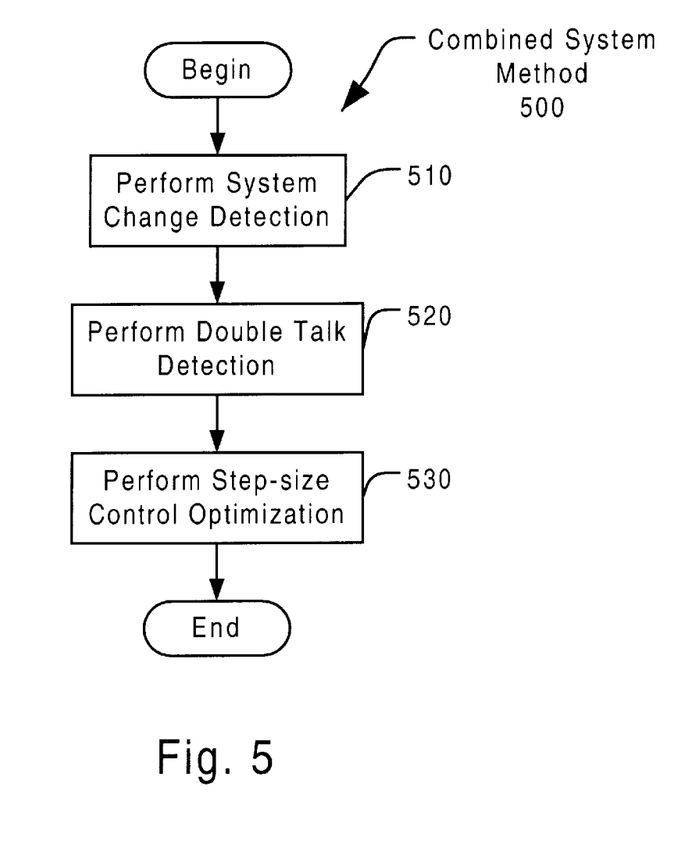
FIG. 5 is a functional block diagram illustrating an embodiment of a combined system method performed in a speaker-phone in accordance with the present invention.

FIG. 5 is a functional block diagram illustrating an embodiment of a combined system method 500 performed in a speaker-phone in accordance with the present invention. In a block 510, system change detection is performed. Subsequently, in a block 520, double-talk detection is performed. Then, finally in a block 530, step size control is performed for optimization. The method 500 shows one such embodiment where the multiple functions of system change detection, double-talk detection, and step size control are all cooperatively performed within a single method.

Figure 6:
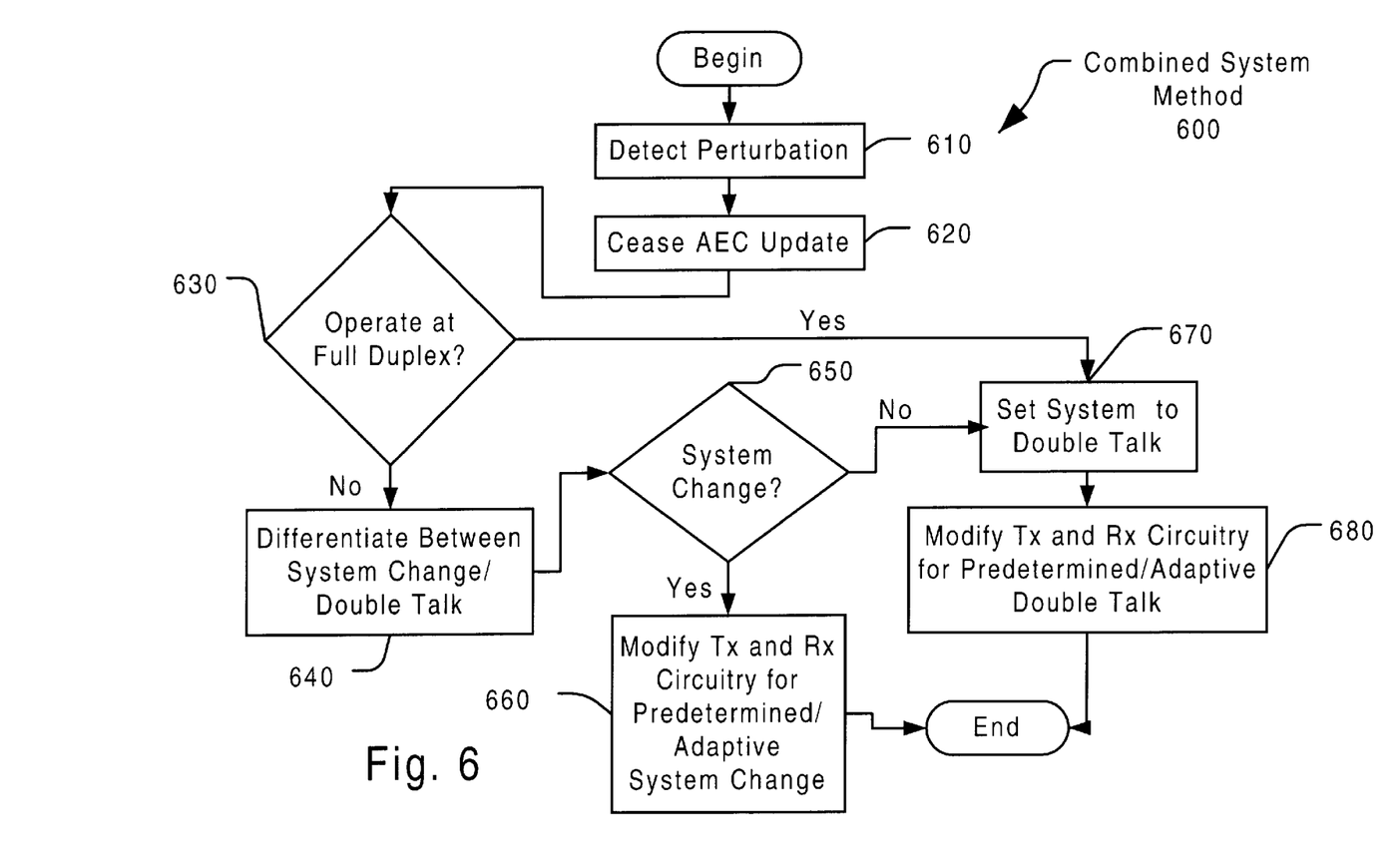
FIG. 6 is a functional block diagram illustrating another embodiment of a combined system method performed in a speaker-phone in accordance with the present invention.

FIG. 6 is a functional block diagram illustrating another embodiment of a combined system method 600 performed in a speaker-phone in accordance with the present invention. In a block 610, a perturbation is detected. In a block 620, the update of the AEC is ceased. Then, in a decision block 630, it is determined whether the method 600 is operating at full duplex. If it is, then the system is set to double-talk as shown in a block 670. Then, the transmit and receive circuitry are each modified for predetermined/adaptive double-talk as shown in a block 680. The method 600 then terminates.

Alternatively, if, as determined in the decision block 630 that the system is not operating at full duplex, then the perturbation is differentiated as being either a system change or double-talk as shown in a block 640. Then, in a decision block 650, is the perturbation is determined to be a system change, then the transmit and receive circuitry are each modified for predetermined/adaptive system change as shown in a block 660. Then method 600 then terminates. Alternatively, if it is determined in the decision block 650 that a double-talk is in fact the perturbation, then the system is set to double-talk as shown in a block 670. Then, the transmit and receive circuitry are each modified for predetermined/adaptive double-talk as shown in the block 680. The method 600 then terminates.

Figure 7:
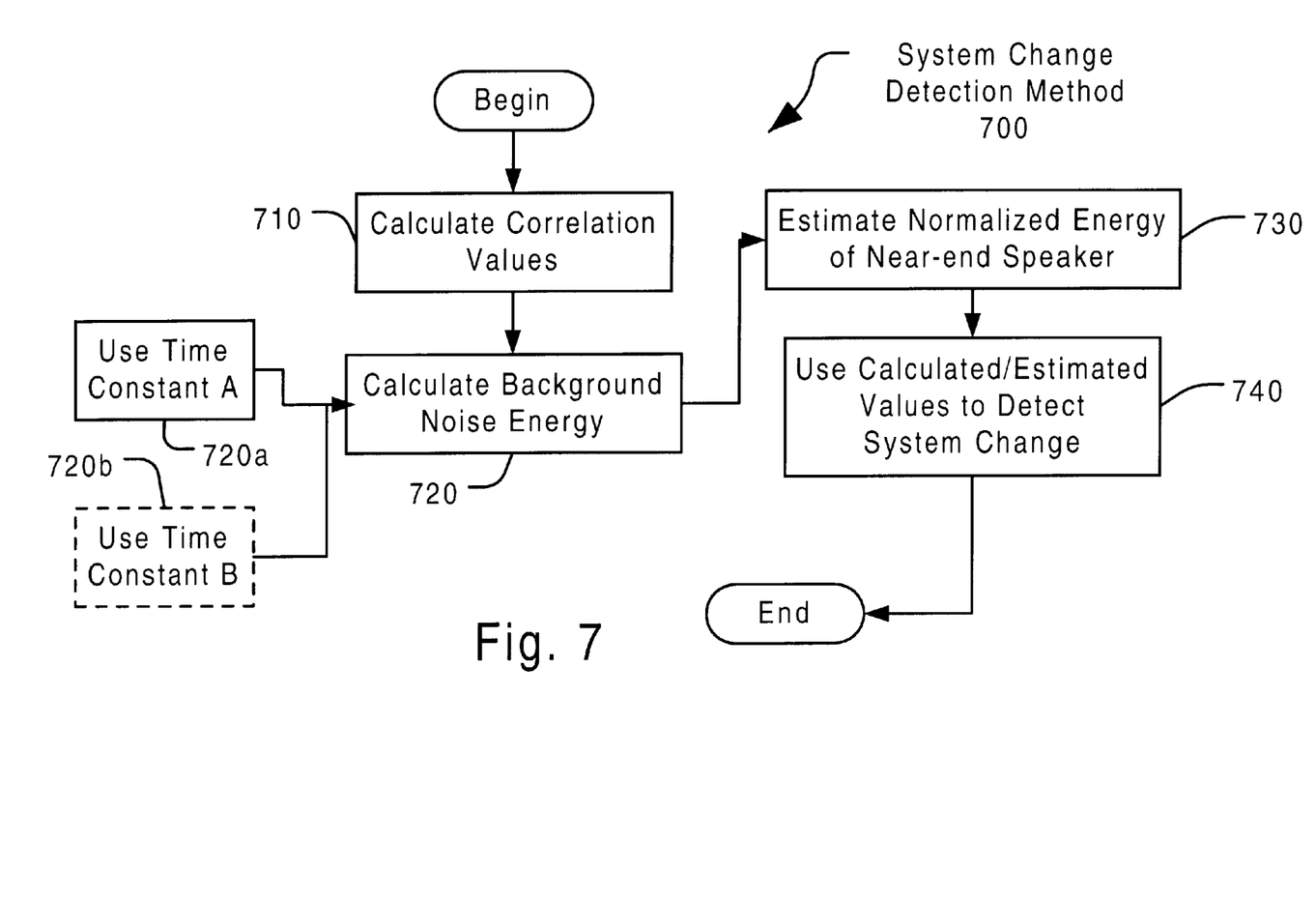
FIG. 7 is a functional block diagram illustrating an embodiment of a system change detection method performed in accordance with the present invention.

FIG. 7 is a functional block diagram illustrating an embodiment of a system change detection method 700 performed in accordance with the present invention. In a block 710, correlation values are calculated. Then, in a block 720, the background noise energy is calculated. The background noise energy calculated in the block 720 is performed using a time constant "A", as shown in a block 720a. If desired, another time constant "B" is used, as shown in a block 720b. Then, in a block 730, the normalized energy of a near-end speaker is estimated. Finally, in a block 740, the calculated/estimated values are used to detect a system change.

Figure 8:
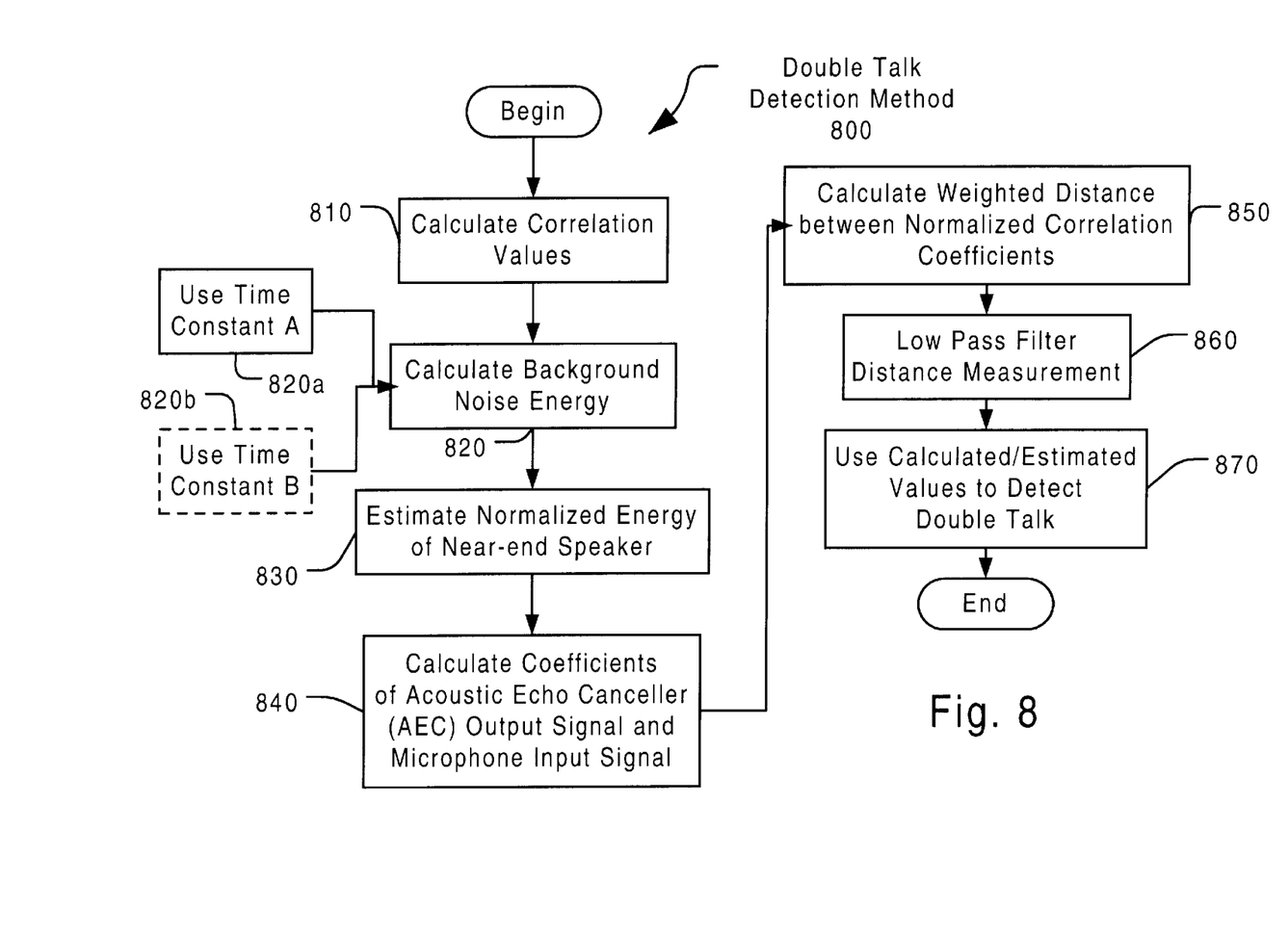
FIG. 8 is a functional block diagram illustrating an embodiment of a double-talk detection method performed in accordance with the present invention.

FIG. 8 is a functional block diagram illustrating an embodiment of a double-talk detection method 800 performed in accordance with the present invention. In a block 810, correlation values are calculated. Then, in a block 820, the background noise energy is calculated. The background noise energy calculated in the block 820 is performed using a time constant "A", as shown in a block 820a. If desired, another time constant "B" is used, as shown in a block 820b.

Then, in a block 830, the normalized energy of a near-end speaker is estimated. In a block 840, the coefficients of the acoustic echo canceller (AEC) output signal and the microphone input signal are calculated. In a block 850, a weighted distance between normalized correlation coefficients is calculated. In a block 860, the distance measurement is low pass filtered. Then, finally, in a block 870, the calculated/estimated values are used to detect double-talk.

Figure 9:
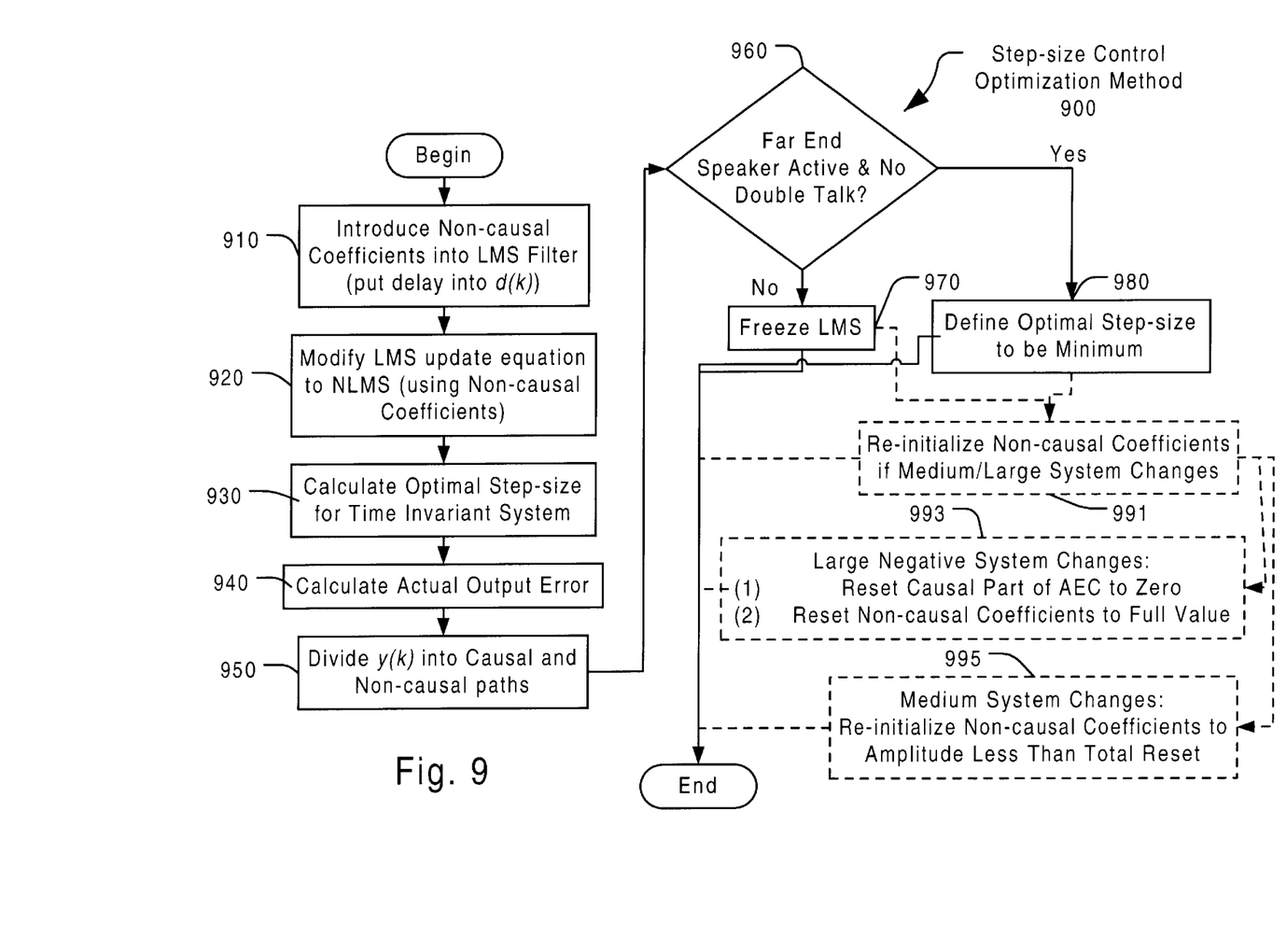
FIG. 9 is a functional block diagram illustrating an embodiment of a step-size control optimization method performed in accordance with the present invention.

FIG. 9 is a functional block diagram illustrating an embodiment of a step-size control optimization method 900 performed in accordance with the present invention. In a block 910, non-causal coefficients are introduced into the least means square (LMS) filter. A delay is put into the d(k) signal. In a block 920, the LMS update equation is updated to a non-causal LMS update equation (NLMS) using the non-causal coefficients. In a block 930, the optimal step-size for a time invariant system is calculated. In a block 940, an actual output error is calculated. In a block 950, the signal y(k) is divided into causal and non-causal paths.

In a decision block 960, it is determined if there is both far end speaker activity and double-talk. If it is determined that both exist, an optimal step-size is defined to be the minimum step-size in a block 980. If desired, additional optional blocks are performed in accordance with the present invention of the method 900. For example, in an optional block 991, the non-causal coefficients are re-initialized if medium/large system changes are detected. Then, the operation of the method 900 is further conditioned upon whether a large or medium system change is detected. For example, in an optional block 993, when large negative system changes are detected, the causal part of the AEC is reset to zero, and the non-causal coefficients are reset to their full value. In addition, in an optional block 995, when medium system changes are detected, the non-causal coefficients are re-initialized to an amplitude that is less than the total reset. If desired, after the operation of the optional block 991, the method 900 simply terminates.

If it is determined in the decision block 960 that there is not both far end speaker activity and double-talk, then the LMS is frozen as shown in the block 970. In one embodiment, the method 900 then terminates. In other embodiments, the method 900 is operable to continue along the optional blocks as shown by the optional blocks 991, 993, and 995 and as described above.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. A speaker-phone that is operable to perform system change detection and double-talk detection using an optimal step size, the speaker-phone comprising:
   a main control circuitry;
   an echo canceller communicatively coupled to the main control circuitry;
   a transmit circuitry communicatively coupled to the main control circuitry;
   a receive circuitry communicatively coupled to the main control circuitry;
   a system change detection circuitry that is operable to perform system change detection, the system change detection circuitry modifies the transmit circuitry and the receive circuitry when a system change is detected;
   a double-talk detection circuitry that is operable to perform double-talk detection, the double-talk detection circuitry modifies the transmit circuitry and the receive circuitry when double-talk is detected;
   a step size control circuitry that is operable to perform step size optimization of a step size in accordance with the following relationship:

$$\alpha_{opt}(k) = \alpha_0 \frac{\sigma_x^2(k) \cdot \sigma_{dis}^2(k)}{\sigma_e^2(k) + bias} < 1; \text{ and}$$

the speaker-phone is operable to differentiate between the system change and the double-talk by comparing a correlation value to a threshold, the correlation value is calculated using an input signal of the echo canceller and an output signal of the echo canceller.

2. The speaker-phone of claim 1, further comprising a microphone having an input signal; and
   wherein the double-talk detection circuitry calculate a plurality of autocorrelation coefficients of the output signal of the echo canceller and the input signal of a microphone to enhance double-talk detection.

3. The speaker-phone of claim 1, wherein the system change detection circuitry considers a speech detect level and a gain of the echo canceller to perform system change detection.

4. The speaker-phone of claim 1, wherein the double-talk detection circuitry uses a time constant to calculate background noise energy.

5. The speaker-phone of claim 1, wherein the double-talk detection circuitry calculates a weighted distance to perform double-talk detection.

6. The speaker-phone of claim 1, wherein the speaker-phone is a full band digital speaker-phone.

7. The speaker-phone of claim 1, wherein the speaker-phone is a full band analog speaker-phone.

8. A speaker-phone that is operable to perform both system change detection and double-talk detection, the speaker-phone comprising:
   a main control circuitry;
   a system change detection circuitry, communicatively coupled to the main circuitry, that is operable to perform system change detection;
   a double-talk detection circuitry, communicatively coupled to the main circuitry, that is operable to perform double-talk detection; and
   the speaker-phone is operable to differentiate between a system change and a double-talk by comparing a correlation value to a threshold, wherein the correlation value is determined using one or more of the following relationships:

$$r_{ye}(k) = \beta_r \cdot r_{ye}(k-1) + (1-\beta_r) \cdot y(k) \cdot e(k),$$

$$r_{dd}(k) = \beta_r \cdot r_{dd}(k-1) + (1-\beta_r) \cdot d(k) \cdot d(k),$$

$$r_{yd}(k) = \beta_r \cdot r_{yd}(k-1) + (1-\beta_r) \cdot y(k) \cdot d(k),$$

$$r_{de}(k) = \beta_r \cdot r_{de}(k-1) + (1-\beta_r) \cdot d(k) \cdot e(k), \text{ or}$$

$$r_{ee}(k) = \beta_r \cdot r_{ee}(k-1) + (1-\beta_r) \cdot e(k) \cdot e(k).$$

9. The speaker-phone of claim 8, further comprising a step size control circuitry that is operable to perform step size optimization of a step size when performing at least one of system change detection and double-talk detection.

10. The speaker-phone of claim 9, wherein the step size control circuitry automatically throttles the step size during double-talk.

11. The speaker-phone of claim 8, wherein the speaker-phone further comprises an acoustic echo canceller having a gain measure; and the speaker-phone is operable to prevent a false double-talk detection by considering the echo canceller gain measure.

12. The speaker-phone of claim 8, further comprising a transmit circuitry and a receive circuitry; and wherein the speaker-phone modifies the transmit circuitry and the receive circuitry to operate at double-talk when operating at full duplex.

13. The speaker-phone of claim 8, wherein the double-talk detection circuitry uses a tuning factor to control a sensitivity used to perform the double-talk detection.

14. The speaker-phone of claim 13, wherein the tuning factor is adjusted by a designer of the speaker-phone.

15. The speaker-phone of claim 8, wherein the speaker-phone further comprises an acoustic echo canceller; and the speaker-phone ceases updating of the acoustic echo canceller when a perturbation is detected.

16. A method to perform system change detection and double-talk detection in a speaker-phone, the method comprising:

detecting a perturbation in the speaker-phone;

ceasing to update an acoustic echo canceller within the speaker-phone; and determining whether the perturbation corresponds to a system change or double-talk within the speaker-phone using one or more of the following relationships:

$$r_{ye}(k)=\beta_r \cdot r_{ye}(k-1)+(1-\beta_r)\cdot y(k)\cdot e(k),$$

$$r_{dd}(k)=\beta_r \cdot r_{dd}(k-1)+(1-\beta_r)\cdot d(k)\cdot d(k),$$

$$r_{yd}(k)=\beta_r \cdot r_{yd}(k-1)+(1-\beta_r)\cdot y(k)\cdot d(k),$$

$$r_{de}(k)=\beta_r \cdot r_{de}(k-1)+(1-\beta_r)\cdot d(k)\cdot e(k), \text{ or}$$

$$r_{ee}(k)=\beta_r \cdot r_{ee}(k-1)+(1-\beta_r)\cdot e(k)\cdot e(k).$$

17. The method of claim 16, further comprising determining whether the speaker-phone operates at full duplex; and adaptively controlling an attenuation of at least one of a receive path and a transmit path of the speaker-phone when the speaker-phone operates at full duplex.

18. The method of claim 16, further comprising performing double-talk detection using a low pass filtered distance measurement.

19. The method of claim 16, wherein the speaker-phone is a full band digital speaker-phone.

20. The method of claim 16, wherein the speaker-phone is a full band analog speaker-phone.

* * * * *